(12) United States Patent
Riedel

(10) Patent No.: US 7,826,161 B2
(45) Date of Patent: Nov. 2, 2010

(54) OBJECT BASED STORAGE DEVICE WITH STORAGE MEDIUM HAVING VARYING MEDIA CHARACTERISTICS

(75) Inventor: Erik Riedel, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 871 days.

(21) Appl. No.: 11/480,049

(22) Filed: Jun. 30, 2006

(65) Prior Publication Data

US 2008/0002272 A1    Jan. 3, 2008

(51) Int. Cl.
*G11B 5/09* (2006.01)

(52) U.S. Cl. .......................................... 360/55; 360/48

(58) Field of Classification Search ........................ None
See application file for complete search history.

(56) References Cited

U.S. PATENT DOCUMENTS

| | | | |
|---|---|---|---|
| 4,644,418 A * | 2/1987 | Banno et al. ................... | 360/39 |
| 4,945,427 A | 7/1990 | Cunningham | |
| 4,984,101 A | 1/1991 | Kanota et al. | |
| 5,787,296 A | 7/1998 | Grimsrud et al. | |
| 5,822,142 A * | 10/1998 | Hicken ......................... | 360/53 |
| 5,896,364 A | 4/1999 | Okazaki et al. | |
| 5,956,745 A | 9/1999 | Bradford et al. | |
| 5,999,351 A * | 12/1999 | Albrecht et al. ................ | 360/48 |
| 6,034,837 A * | 3/2000 | Purkett ..................... | 360/78.04 |
| 6,065,095 A | 5/2000 | Sokolov et al. | |
| 6,195,217 B1 | 2/2001 | Park | |
| 6,298,401 B1 | 10/2001 | Anderson | |
| 6,321,358 B1 | 11/2001 | Anderson | |
| 6,571,310 B1 | 5/2003 | Ottesen et al. | |
| 6,611,390 B1 * | 8/2003 | Egan ........................... | 360/31 |
| 6,631,493 B2 | 10/2003 | Ottesen et al. | |
| 6,765,737 B1 | 7/2004 | Lim et al. | |
| 6,839,802 B2 * | 1/2005 | Dimitri et al. ................ | 711/112 |
| 2002/0039246 A1 * | 4/2002 | Ding et al. ..................... | 360/75 |
| 2002/0172117 A1 | 11/2002 | Sako et al. | |
| 2003/0088591 A1 | 5/2003 | Fish | |
| 2003/0187859 A1 | 10/2003 | Belov | |
| 2003/0187860 A1 | 10/2003 | Holland | |
| 2003/0187866 A1 | 10/2003 | Zelenka | |
| 2003/0187883 A1 | 10/2003 | Zelenka et al. | |
| 2005/0078393 A1 | 4/2005 | Cho | |
| 2006/0103972 A1 * | 5/2006 | Chu et al. ................. | 360/78.04 |

OTHER PUBLICATIONS

M. Mesnier et al., "Object-Based Storage", *IEEE Communications Magazine*, Aug. 2003, pp. 84-90.

* cited by examiner

*Primary Examiner*—Jason C Olson
(74) *Attorney, Agent, or Firm*—Robert P. Lenart, Esq.; Benjamin T. Queen, II; Pietragallo Gordon Alfano Bosick & Raspanti, LLP

(57) ABSTRACT

An apparatus having a storage medium that includes a first region having a first characteristic and a second region having a second characteristic for storage of a plurality of data objects is disclosed. Each of the objects has an attribute that is determinative of the object being stored in either the first region or the second region.

19 Claims, 8 Drawing Sheets

OBJECT BASED STORAGE DEVICE WITH STORAGE MEDIUM HAVING VARYING MEDIA CHARACTERISTICS

FIELD OF THE INVENTION

This invention relates generally to the field of data storage and, more particularly, to an apparatus and method for optimizing the storage of data in a data storage device.

BACKGROUND INFORMATION

Various types of data storage devices are generally known. One common type of data storage device is a disc drive. The most basic parts of a disc drive are an information storage disc that is rotated, an actuator that moves a transducer to various locations over the disc, and electrical circuitry that is used to write and read data to and from the disc. Information representative of data is stored on the surface of the storage disc. Disc drive systems read and write information stored on tracks on storage discs. Transducers in the form of read/write heads read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track.

One constant goal associated with disc drives is to increase the amount of data that can be stored on the disc drive. There are, of course, many characteristics that can be varied or adjusted for increasing the amount of data on a disc drive. One example is to increase the number of tracks per inch ("TPI") that are positioned on the surface of a disc. Another way of saying the same thing is that the track density is increased. However, increasing the TPI or the track density must be balanced against other problems that may occur with the disc drive. For example, increasing the TPI or the track density, which allows more data to be packed into the same physical area, can increase the chance of off-track writes (mis-writes) that may destroy tracks adjacent to the data currently being written. The occurrence of off-track writes decreases the overall reliability of the disc drive.

What is needed, therefore, is a data storage device having a desired capacity while maintaining overall reliability of the device. What is also needed is a data storage device that overcomes disadvantages, limitations and shortcomings of known data storage devices.

SUMMARY OF THE INVENTION

The invention meets the identified need, as well as other needs, as will be more fully understood following a review of this specification and drawings.

An aspect of the present invention is to provide an apparatus that comprises a storage medium including a first region having a first track density and a second region having a second track density. The apparatus further includes a plurality of data objects, wherein each of the objects has an attribute that is determinative of the object being stored in either the first region or the second region.

Another aspect of the present invention is to provide an apparatus that comprises a storage media having a plurality of track density regions and an object based storage interface in communication with the storage media. The interface directs a data object to be stored in one of the track density regions.

A further aspect of the present invention is to provide an apparatus that comprises a storage medium including a first region having a first characteristic and a second region having a second characteristic. The apparatus further includes a plurality of data objects, wherein each object has an attribute determinative of the object being stored in either the first region or the second region. For example, the first and/or second characteristics may include, but is not limited, tracks per inch (TPI), track density, bits per inch (BPI) and/or areal density.

These and other aspects of the present invention will be more apparent from the following description.

DETAILED DESCRIPTION

Figure 1:
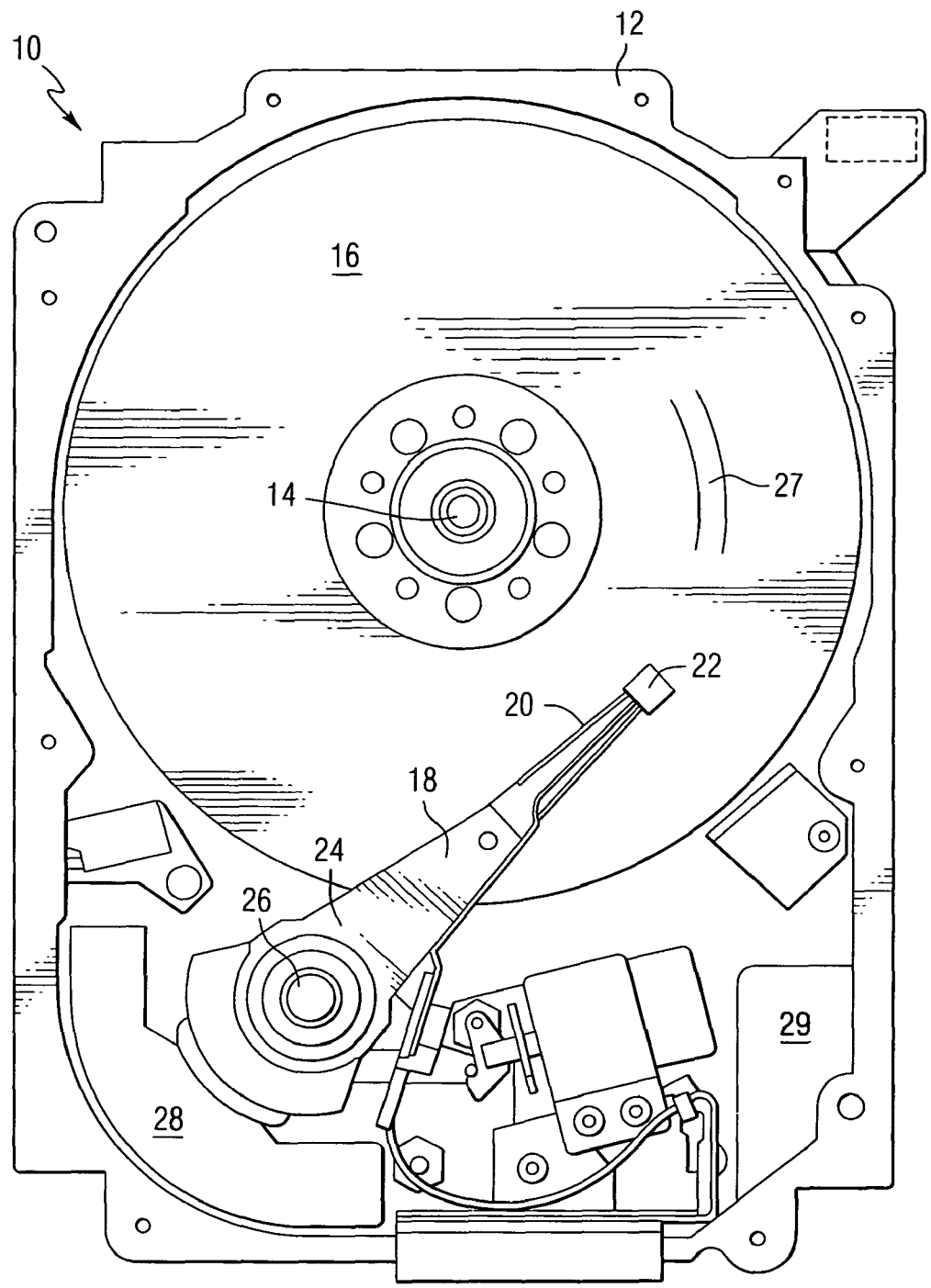
FIG. 1 is a pictorial representation of the mechanical portion of a disc drive constructed in accordance with the present invention.

Referring to the drawings, FIG. 1 is a pictorial representation of a portion of a disc drive 10 that can be constructed in accordance with the invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor, which may be a voice coil motor 28, is located at the arm's second end 24, for pivoting the arm 18 to position the head 22 over a desired sector of the disc 16. Data are stored in a plurality of concentric tracks 27 on the storage medium. Command and control electronics for the disc drive, such as a disc drive controller 29, are mounted in the housing 12.

The invention relates generally to the disc drive 10 being able to differentiate among multiple data regions and being able to format the regions of the disc 16 to best fit the access patterns of particular subsets of user data. Advantageously, this would allow for the overall reliability and capacity of the disc drive 10 to be balanced and to accommodate the nature of the date being stored. This is accomplished by the invention providing for the ability to differentiate among types of data and the ability to individually format the regions of the disc 16 to have different characteristics. For example, critical or important data could be stored exclusively in a low TPI region and non-critical or temporary data could be stored exclusively in a high TPI region.

The invention further relates to utilizing object-based storage device (OSD) technology that is being developed at the storage device, e.g. disc drive, level. Specifically, the invention relates to differentiating among user data types by taking advantage of the OSD interface where requests to the disc drive 10 are addressed to device-managed objects and not to individually addressed sectors. When individual sectors are used, it is not feasible to maintain a history or make usage predictions for each sector. When using objects associated with OSD, such information can be compactly maintained and such decisions can be effectively made by using, for example, explicit and implicit attributes associated with each object, as will be explained in detail herein.

As used herein, an object is an independent and unique collection of user data, system attributes and user defined attributes that is identified by a unique label and whose data are arbitrarily accessible with byte granularity. It is similar to a file except that unlike a file, an object binds attributes to data. Each object includes metadata and user data. The OSD firmware layer is responsible for layout of the file system metadata and user data on the storage media. Metadata blocks are used for storing the identity, attributes and locations of user data blocks, and to associate a user object to user data fragments.

Figure 2:
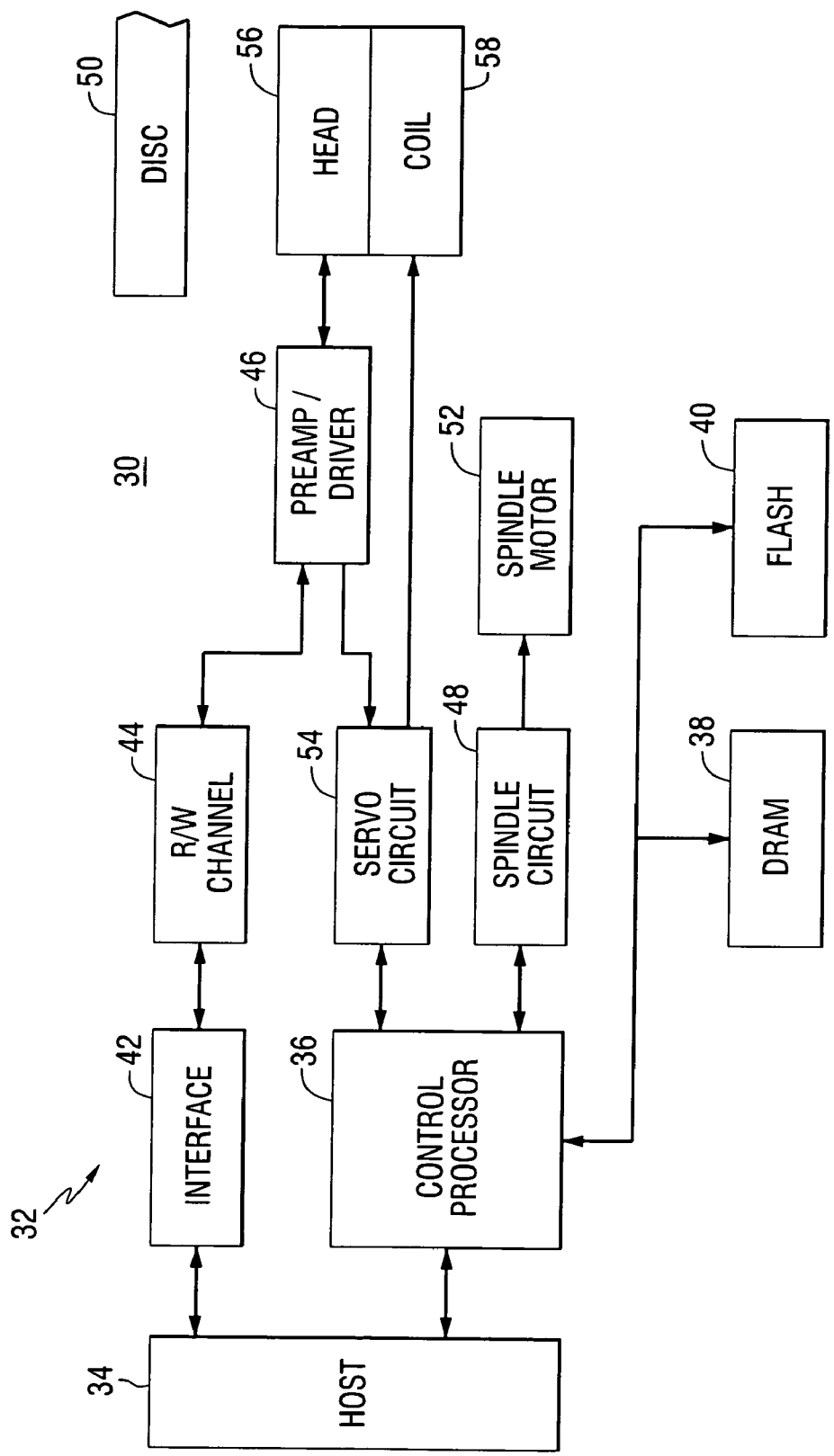
FIG. 2 is a block diagram of system including a disc drive constructed in accordance with the present invention.

A functional block diagram of an object-based storage system 30, including disc drive controller 32, in accordance with an embodiment of the invention is provided in FIG. 2. A host computer 34 provides top level control of a disc drive controller processor 36, which in turn controls the operation of the disc drive 30 in accordance with programming and information stored in dynamic random access memory (DRAM) 38 and non-volatile flash memory 40.

Data to be stored by the disc drive are transferred from the host computer 34 to an interface circuit 42, which includes a data buffer for temporarily buffering the data and a sequencer for directing the operation of a read/write channel 44 and a preamp/driver circuit 46 during data transfer operations. A spindle circuit 48 is provided to control the rotation of the disc 50 by the spindle motor 52.

A servo circuit 54 is provided to control the position of one or more recording heads 56 relative to one or more discs 50 as part of a servo loop established by the head 56, the preamp/driver 46, the servo circuit 54 and the coil 58 that controls the position of an actuator arm. The servo circuit 54 includes a digital signal processor (DSP) which is programmed to carry out two main types of servo operation: seeking and track following.

Figure 3:
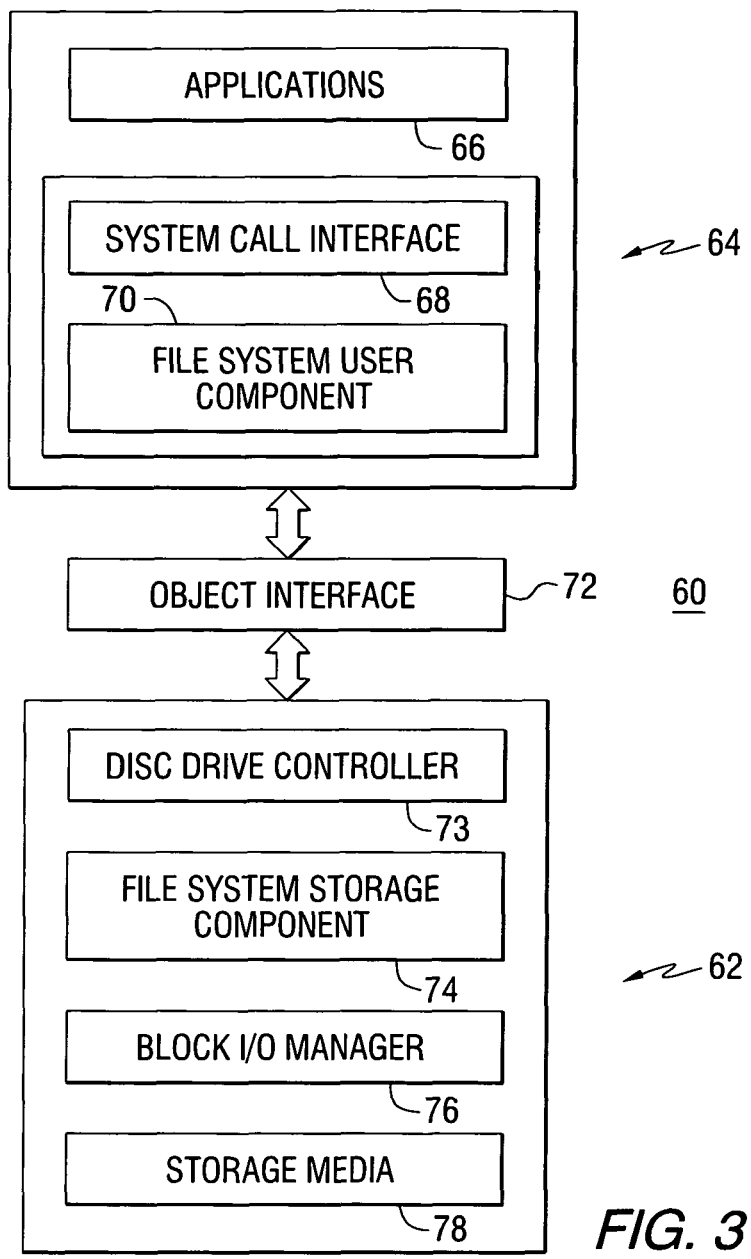
FIG. 3 is a block diagram of an object-based storage system.

FIG. 3 is a block diagram of an object-based storage system 60 including a disc drive 62 incorporating OSD technology in accordance with an embodiment of the invention. A host computer 64, which may run numerous applications 66, includes a system call interface 68 and a file system user component 70. The host transmits information through an object interface 72 to the OSD disc drive 62. The OSD disc drive 62 includes, for example, a disc drive controller 73, a file system storage component 74, a block input/output manager 76, and one or more storage media 78.

Figure 4:
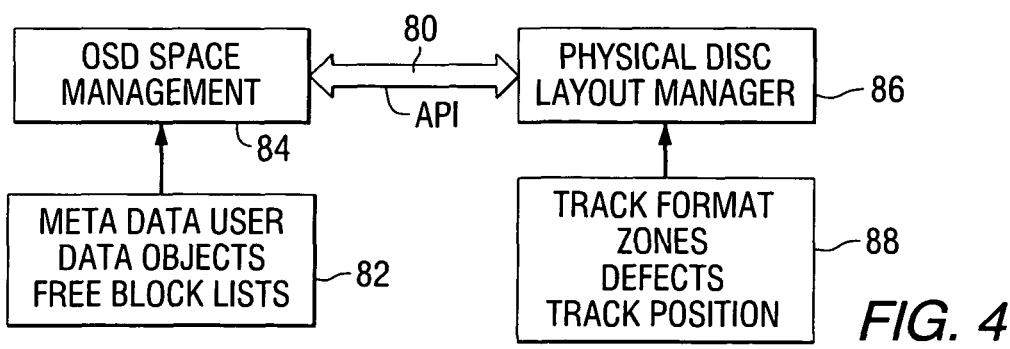
FIG. 4 is a block diagram of portions of firmware in a disc drive controller.

FIG. 4 is a block diagram of the OSD and interface firmware layer communication in accordance with an embodiment of the invention. The OSD firmware layer uses a firmware application program interface (API) 80 for making block requests to the drive. Free block lists 82 are maintained for the metadata and user data objects. The OSD space management 84 provides the OSD firmware layer with candidate starting block locations when new user data blocks are needed to satisfy WRITE, WRITE APPEND, or CREATE commands. A physical disc-layout manager 86 receives the commands and controls the track format, zones, defects, and track position 88.

Figure 5:
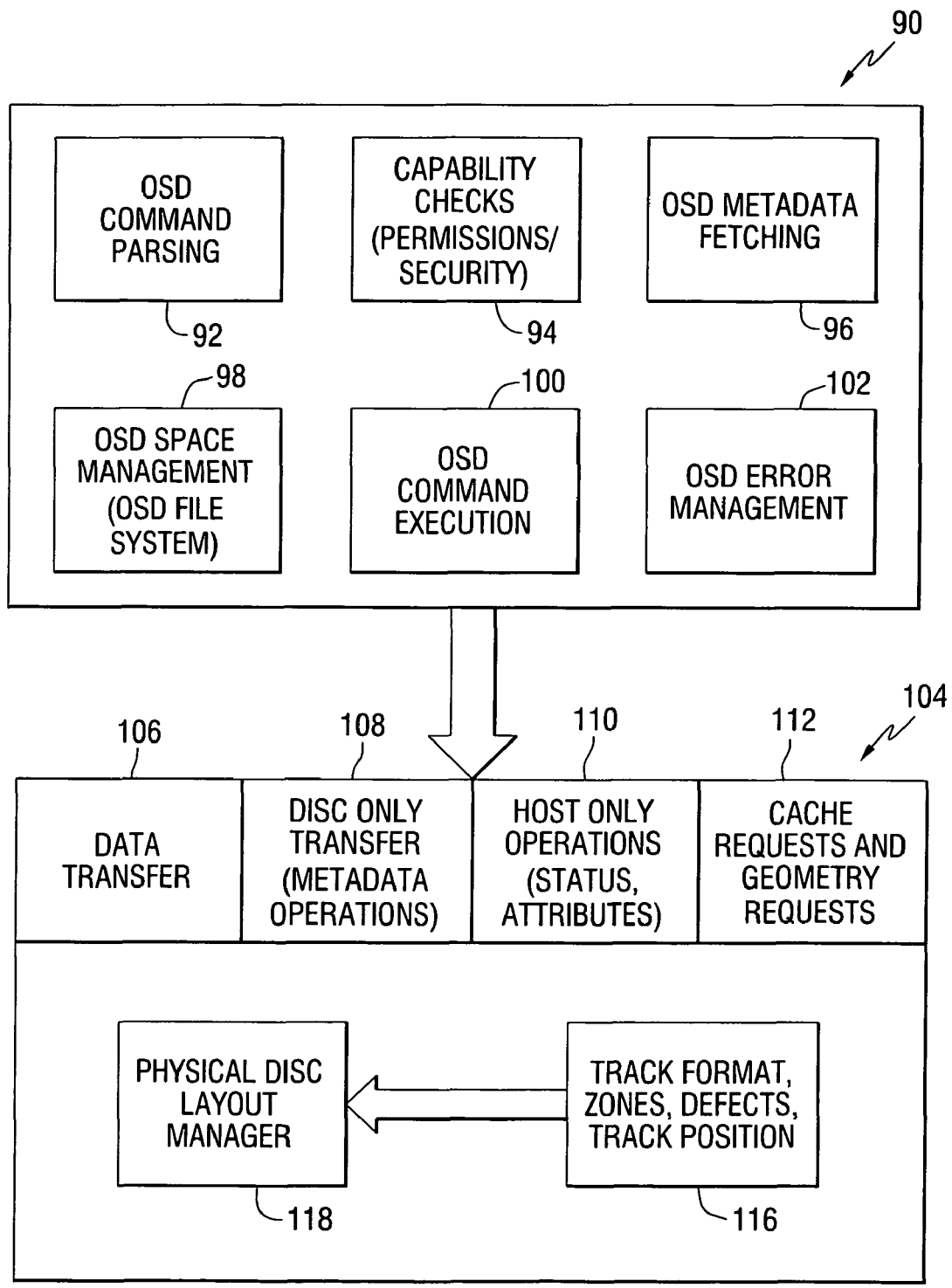
FIG. 5 is a block diagram of portions of firmware in a disc drive controller.

FIG. 5 is a more detailed block diagram of the drive firmware. An OSD firmware layer 90 includes firmware for command parsing 92, capability checks and permissions/security 94, metadata fetching 96, space management (OSD file system) 98, command execution 100, and error management 102. The application interface 104 includes firmware for implementing data transfers 106, disc only transfers 108, host only operations 110, and cache and geometry requests 112. Firmware determines track format, zones, defects, and track position 116 and provides this information to the physical disc layout manager 118.

The OSD firmware layer contains firmware that parses and executes OSD commands. Each executed OSD command is typically broken into multiple steps: parse, metadata fetch, object data location calculations, standard firmware block command construction, and transfer requests made through the OSD API. The API is constructed to implement four general functions: data transfers, disc only transfers, host only transfers and cache and geometry requests. Data transfers are used to transfer data to/from the disc or to/from the host interface. Disc only transfers represent disc reads and writes that do not involve transfers to/from the host interface. Host only transfers are used to transfer data to/from the host interface. Cache and geometry requests are used to reserve buffer memory for ongoing OSD commands and to request particular services related to the physical geometry of the storage such as the number of sectors per track in the given zone, the TPI of a particular zone, or other reliability characteristics. Geometry requests would be used for implementing the operations discussed in this description.

Figure 6:
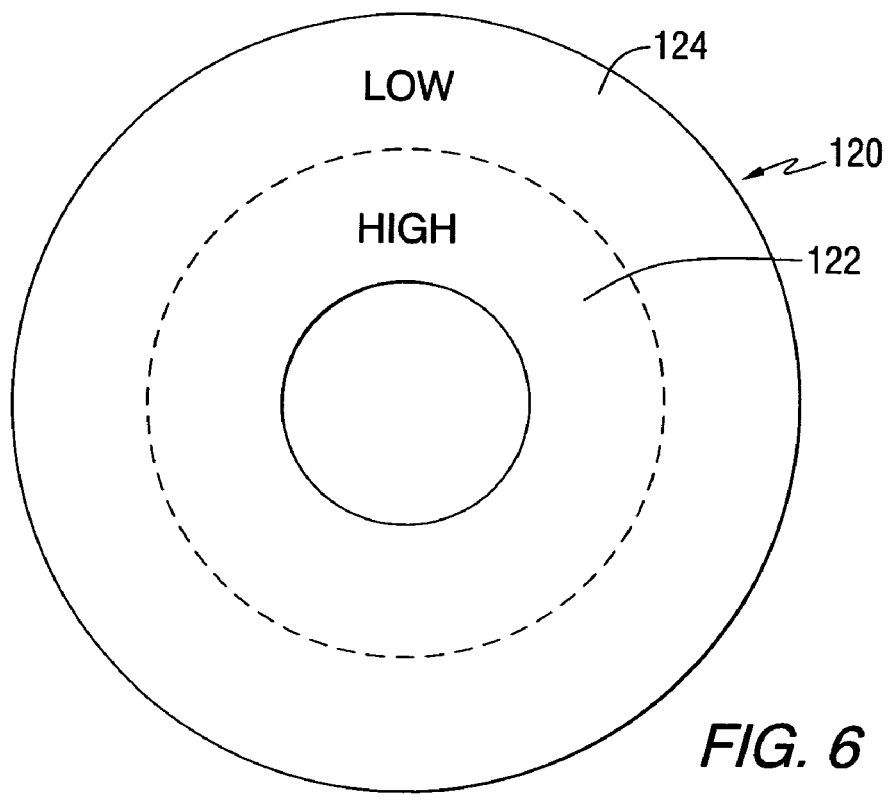
FIG. 6 is an embodiment of a storage media in accordance with the present invention.

FIG. 6 illustrates a storage media, such as disc 120, according to an embodiment of the invention. Specifically, the invention provides for the ability to differentiate among types of data that is to be stored in the form of an object and the ability to have regions of the disc 120 to have different characteristics. For example, the disc 120 can have a "HIGH" region 122 having a defined first track density or TPI and a "LOW" region 124 having a defined second track density or TPI. A larger number of objects can then be stored in the HIGH region 122 than can be stored in the LOW region 124. Since the chance of off-track writes or mis-writes is less likely in the LOW region 124 than in the HIGH region 122, more critical or important objects could be stored in the LOW region 124 and less critical or temporary data could be stored in the HIGH region 122.

It will be appreciated that the HIGH region 122 could be switched with the LOW region 124 and be on the outer diameter of the disc 120. It will also be appreciated that multiple "HIGH" regions and/or multiple "LOW" regions could be provided on disc 120 as needed. Furthermore, it will be appreciated that regions of varying track density or TPI such as, for example, "HIGH", "INTERMEDIATE", and "LOW" could be provided on the disc 120 in accordance with the invention as well.

It will be appreciated that the invention has utility for any type of storage system. The invention may be used with various types of recording heads, recording media, or any other recording schemes for storing, reading and/or writing data.

It will also be appreciated that other types of storage media such as, for example, a heat assisted magnetic recording media or a ferroelectric storage media, having different regions of storage density capabilities may also be used in accordance with the invention. In addition, it will also be appreciated that characteristics of the media other than TPI or track density such as, for example, bits per inch (BPI) or areal density, could be used with the invention for defining different storage regions on a storage media.

Figure 7:
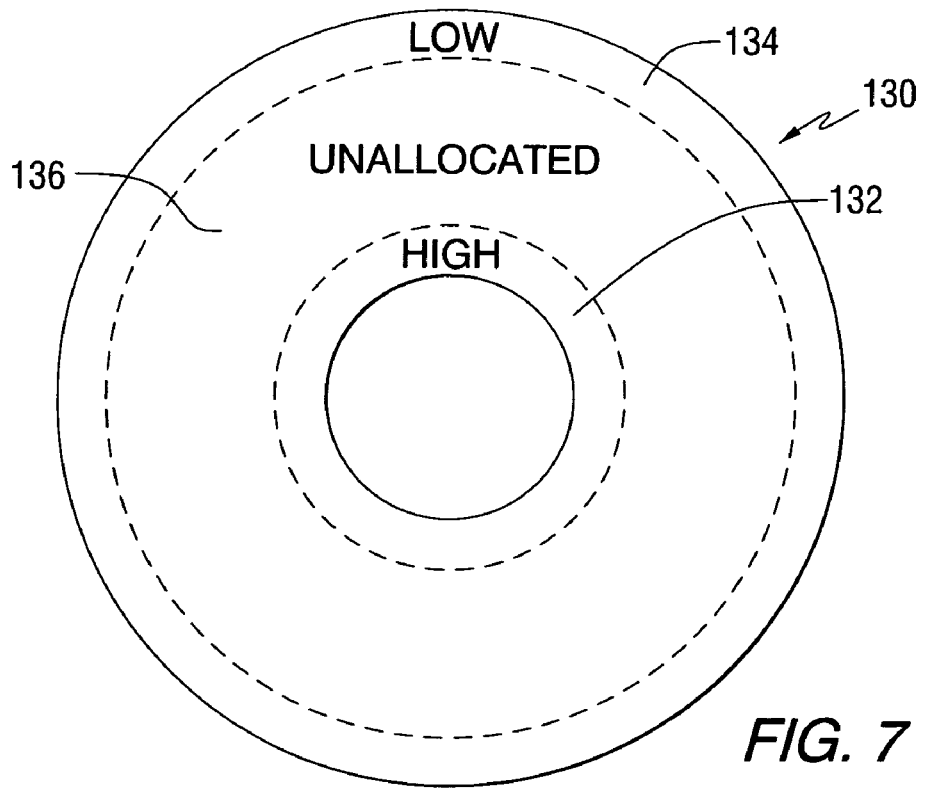
FIG. 7 is an additional embodiment of a storage media in accordance with the present invention.

FIG. 7 illustrates an additional embodiment of a storage media, such as disc 130, having a HIGH region 132, a LOW region 134 and an UNALLOCATED region 136 wherein the UNALLOCATED region 136 has not been formatted to have a defined track density or TPI. The UNALLOCATED region 136 can be formatted once either the HIGH region 132 or the LOW region 134 is filled to capacity. For example, if the HIGH region 132 contains the maximum number of objects that may be stored in that region based on the track density or TPI thereof, then all or part of the UNALLOCATED region 136 may be formatted to have the same track density or TPI as the HIGH region 132. It will be appreciated, that the disc 130 may be provided to have various arrangements of HIGH, LOW and UNALLOCATED regions as needed.

As described herein, the invention advantageously provides for the ability to differentiate among types of data and to store the data in a particular region or location on a storage media, such as in a HIGH track density/TPI region or a LOW track density/TPI region, as illustrated in FIG. 6. In accordance with the invention, OSD technology provides a convenient tool for accomplishing the task of storing data in a particular region of a disc. For example, in one embodiment of the invention, the determination of the appropriate storage characteristics for a data object is to provide a defined attribute that allows a user to explicitly mark a particular data object for storage in a particular region of the storage media, such as disc 120. The attribute may be created to allow the object to be designated as, for example, "HIGH" for storage in the HIGH region 122 or for the attribute to be designated as "LOW" for storage in the LOW region 124. Alternatively, the attribute could be defined in many different ways to explicitly designate which region of the disc 120 a particular object is to be stored. For example, rather than the attribute having a HIGH or LOW designation, the attribute could be defined by an integer such as, for example, "1" or "0" wherein the integer 1 may correspond to the HIGH region 122 and the integer 0 would correspond to the LOW region 124.

Figure 8:
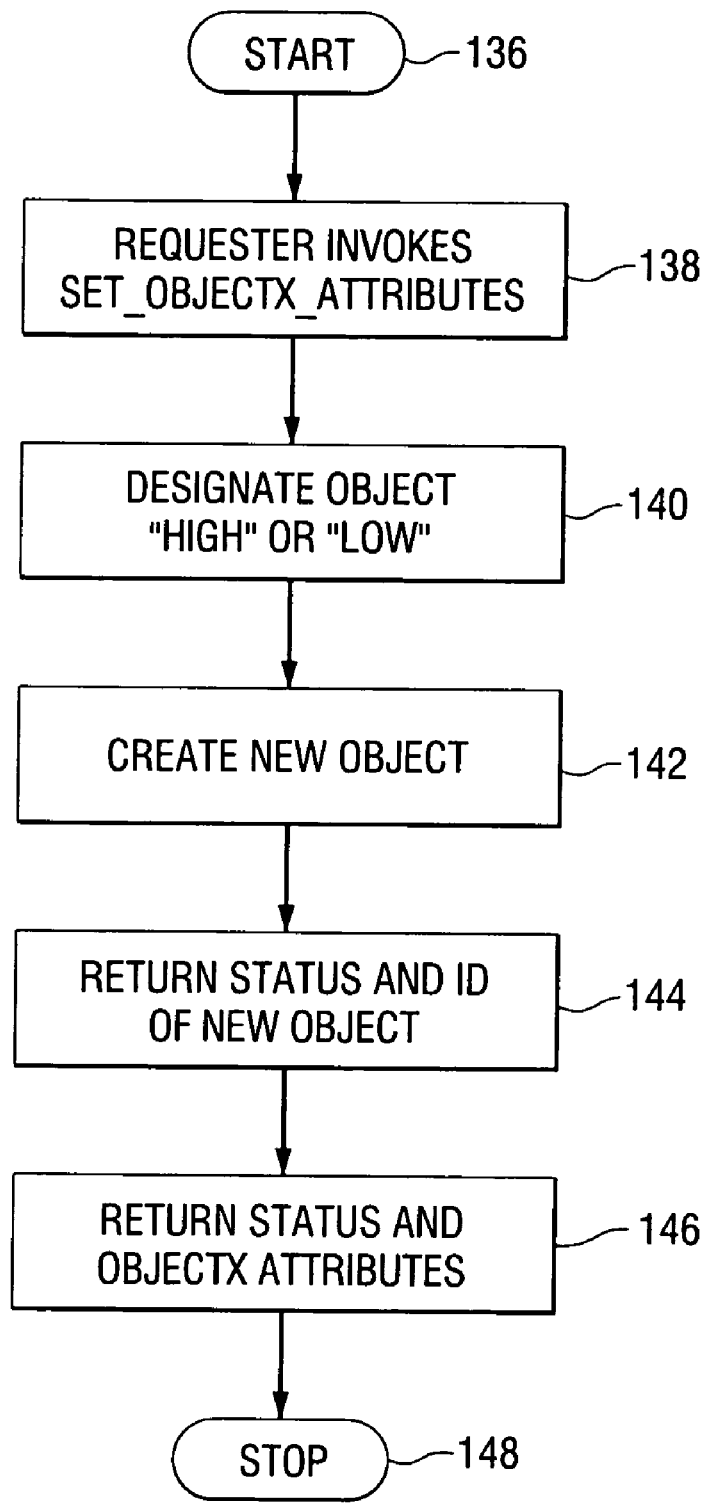
FIG. 8 is a flow diagram illustrating making an explicit determination of storage location for a data object in accordance with the invention.

FIG. 8 sets forth in more detail from start block 136 to stop block 148 how an object is created to have attributes, which would allow a user to explicitly designate where the object would be stored. Specifically, a user using an associated storage device that incorporates OSD technology would invoke the Set_ObjectX_Attributes as indicated in block 138. This is accomplished by the user providing basic information such as, for example, permission information and object identification, that is processed by a disc drive controller, such as disc drive controller 32. Disc drive controller 32 then creates the particular attribute of a specified object with the information provided by the user, as indicated in block 140. The object can be designated, as described hereinabove, as "HIGH" or "LOW" or in any other similar manner as desired. The disc drive controller 32 then creates a new object, as indicated in block 142, that contains the designations selected in block 140. The disc drive controller 32 thus creates the new object by allocating the number of blocks associated with the object and by modifying the object attributes to indicate the time of object creation and to set other attributes that may be provided or associated with the object as well. The disc drive controller then returns the status and identification (ID) of the new object, as indicated in block 144. The status and ObjectX attributes can then be returned, as indicated in block 146. The user is able to then explicitly mark where particular objects may be stored.

In another embodiment of the invention, the determination of the appropriate storage characteristics for a data object is through an implicit choice based on explicit attributes of the object in association with the usage history of the object. The attributes may include, for example, object size, most recent access time or most recent modification time. The usage history of the object may include, for example, the number of times an object has been written, the number of times an object has been read, or the number of times the object has been appended to. To implement the implicit choice for storage location, the disc drive controller 32 would use a data structure (such as illustrated in FIG. 9) to make decisions using an object storage location algorithm that applies logic principles (such as illustrated in FIG. 10) regarding which particular region of the disc 120 an object should be stored in.

Figure 9:
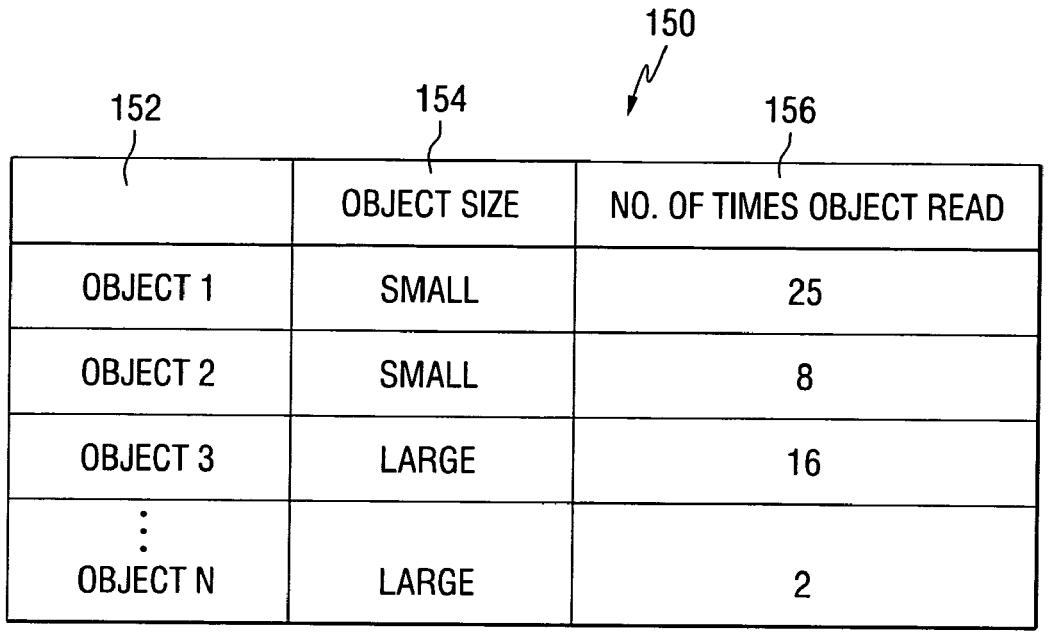
FIG. 9 is a table illustrating a data structure for use with the present invention.

As indicated, FIG. 9 sets forth an example of a data structure 150 that accumulates and stores information regarding an object, such as attributes of the object and usage history of the object. For illustration purposes, data structure 150 includes an object column 152, a single attribute column 154 for the attribute "OBJECT SIZE" and a single column 156 for usage history "NO. OF TIMES OBJECT READ". It will be appreciated that the object column 152 may contain as many objects such as OBJECT 1, OBJECT 2, OBJECT 3 . . . OBJECT N and as many additional attribute columns and usage history columns as necessary or desired.

Figure 10:
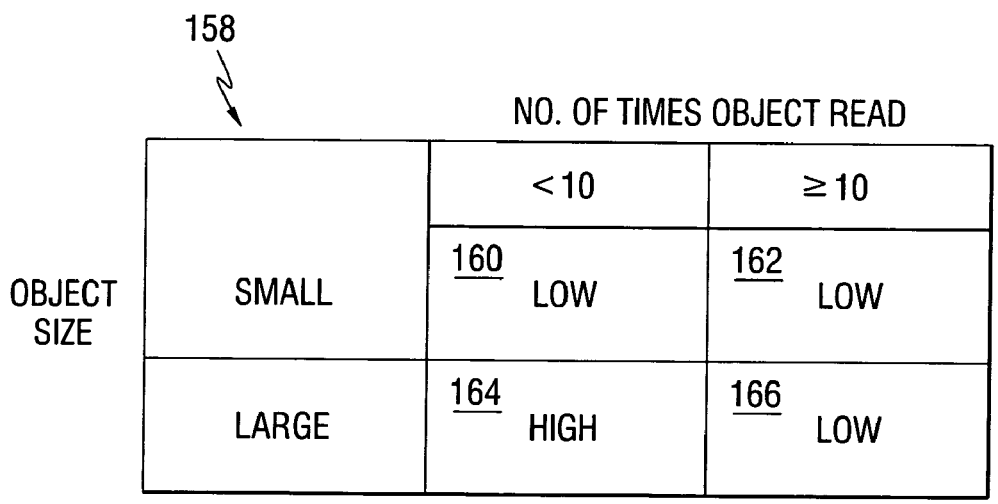
FIG. 10 is a logic table illustrating an implicit determination of storage location for a data object in accordance with the invention.

FIG. 10 illustrates a logic table 158 that utilizes the data set forth in the attribute column 154 of FIG. 9 and the usage history data set forth in usage history column 156 to implicitly make a decision as to where a particular object such as, for example, OBJECT 1, OBJECT 2, OBJECT 3 . . . OBJECT N should be stored on the disc 120. Specifically, the logic table 158 provides that for a particular object having an object size attribute of "SMALL" and having a usage history of the NO. OF TIMES OBJECT READ of <10 then that particular object would be stored in the "LOW" region of the disc 120 as indicated in block 160. For another object having an object size of "SMALL" and that has been read ≧10 times, then that particular object would also be stored in the "LOW" region of the disc 120 as indicated in block 162. As further illustrated in logic table 158, for an object size attribute of "LARGE" that has been read <10 times, the object would be stored in the "HIGH" region of the disc 120 as indicated at block 164. Lastly, logic table 158 indicates that an object size attribute of "LARGE" that has been read ≧10 times would be stored in the "LOW" region of the disc 120 as indicated at block 166. The particular designations for storage location indicated in blocks 160, 162, 164 and 166 are established as desired in the object storage location algorithm applied by the disc drive controller 32 and may be established and/or modified by a developer or user as necessary or desired.

Referring to FIGS. 9 and 10 and applying the data structure 150 to the logic table 158, OBJECT 1 would be stored in the "LOW" region as indicated in block 162, OBJECT 2 would be stored in the "LOW" region as indicated in block 160, OBJECT 3 would be stored in the "LOW" region as indicated in block 166, and OBJECT N would be stored in the "HIGH" region as indicated in block 164. It will be appreciated that the logic table 158 can be expanded to any size necessary to apply the invention as discussed herein to objects having more than one attribute and more than one type of usage history.

Figure 11:
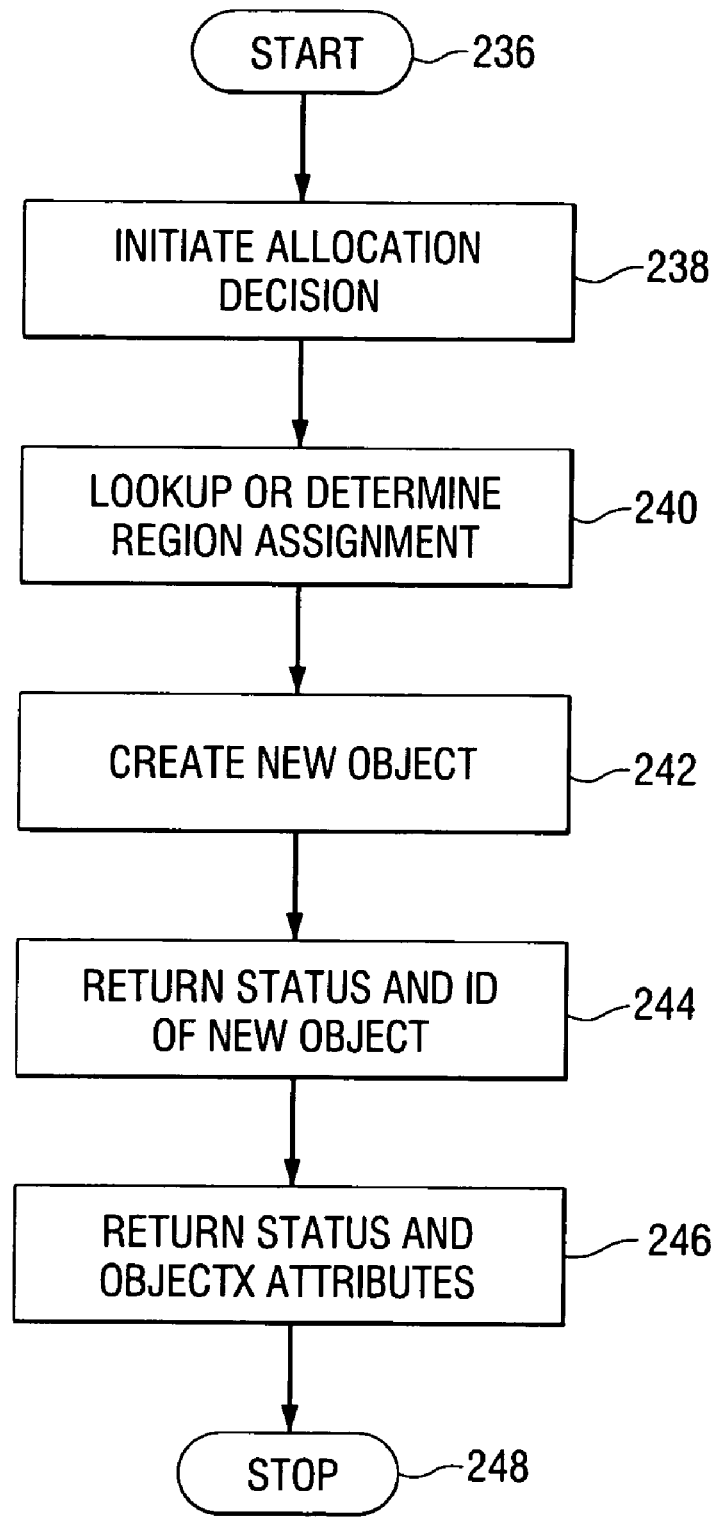
FIG. 11 is a flow diagram illustrating making an implicit determination of a storage location for a data object in accordance with the invention.

FIG. 11 sets forth a flow chart (beginning with start block 236 and ending with stop block 248) that illustrates how a user would implement the implicit choice aspect of the invention such as described, for example, in FIGS. 9 and 10. Specifically, a user using an associated storage device that incorporates OSD technology would begin by initiating an allocation decision, as indicated in block 238. This is followed by the system applying logic (such as, for example, illustrated in FIGS. 9 and 10) directed to lookup or determining region assignment, as indicated in block 240. The object can be assigned, as described hereinabove, as "HIGH" or "LOW" or in any other similar manner as desired. The disc drive controller 32 then creates a new object, as indicated in block 242, that contains the assignments selected in block 240. The disc drive controller 32 thus creates the new object by allocating the number of blocks associated with the object and by modifying the object attributes to indicate the time of object creation and to set other attributes that may be provided or associated with the object as well. The disc drive controller 32 then returns the status and identification (ID) of the new object, as indicated in block 244, that has just been created. The status and ObjectX attributes can then be returned, as indicated in block 146.

Whereas particular embodiments have been described herein for the purpose of illustrating the invention and not for the purpose of limiting the same, it will be appreciated by those of ordinary skill in the art that numerous variations of the details, materials, and arrangement of parts may be made within the principle and scope of the invention without departing from the invention as described in the appended claims.

What is claimed is:

1. An apparatus, comprising:
a storage medium including a first region having a first track density and a second region having a second track density, wherein the first track density is different from the second track density;
a plurality of uniquely identified data objects, each said data object including metadata and user data, with an attribute being stored in the metadata; and
a controller that uses the attribute to determine if the data objects are to be stored in either said first region or said second region.

2. The apparatus of claim 1, wherein the metadata and user data is accessible with byte granularity.

3. The apparatus of claim 1, wherein the attribute defines a relative importance of the data object.

4. The apparatus of claim 3, wherein firmware implements an object storage location algorithm that performs the determination of where to store each said data object.

5. The apparatus of claim 1, wherein said attribute is indicative of usage history of said data object.

6. The apparatus of claim 5, further comprising a data structure that maintains a history of said attribute of each said data object.

7. The apparatus of claim 6, further comprising an object storage location algorithm in communication with said data structure to perform the determination of where to store each said data object.

8. The apparatus of claim 1, further comprising a third region that is unformatted.

9. The apparatus of claim 1, further comprising a third region having a third track density.

10. An apparatus, comprising:
a storage media having a plurality of regions having different track densities; and
an object based storage interface in communication with said storage media, wherein said interface receives a plurality of uniquely identified data objects, each said data object including metadata and user data, with an attribute being stored in the metadata and uses the attribute to directs the data object to be stored in one of said regions.

11. The apparatus of claim 10, further comprising firmware implementing an object storage location algorithm that uses the metadata to determine which of said regions said data object is to be stored in.

12. The apparatus of claim 10, wherein said data object includes an attribute determinative of which of said regions each said data object is stored in.

13. The apparatus of claim 12, wherein said attribute is indicative of characteristics of said data object.

14. The apparatus of claim 13, further comprising a data structure that maintains a history of said attribute of said data object.

15. The apparatus of claim 14, further comprising an object storage location algorithm in communication with said data structure to perform the determination of where to store said data object.

16. The apparatus of claim 10, wherein said storage medium includes a plurality of concentric data tracks.

17. An apparatus, comprising:
a storage medium including a first region having a first characteristic including one of a first bits per inch and a first areal density and a second region having a second characteristic including one of a second bits per inch and a second areal density, wherein the first bits per inch differs from the second bits per inch and the first areal density differs from the second areal density; and
a plurality of uniquely identified data objects, wherein each of said data objects includes metadata and user data, with an attribute being stored in the metadata, wherein the attribute is determinative of said data object being stored in either said first region or said second region.

18. The apparatus of claim 17, and the apparatus further comprising a processor implementing an object storage location algorithm that uses the metadata to determine where to store said data objects.

19. The apparatus of claim 17, further comprising a data structure that maintains a history of attributes of said data objects.

\* \* \* \* \*